United States Patent [19]

Pierrat

[11] Patent Number: 4,630,810
[45] Date of Patent: Dec. 23, 1986

[54] RESILIENT COUPLING WITH A LIMITED RANGE OF RADIAL MOVEMENT, MORE PARTICULARLY FOR A PULLED WHEEL ATTACHMENT

[75] Inventor: Jacques Pierrat, Paris, France

[73] Assignee: Hutchinson Societe Anonyme, Paris, France

[21] Appl. No.: 727,287

[22] Filed: Apr. 25, 1985

[30] Foreign Application Priority Data

May 2, 1984 [FR] France ............................. 84 06800

[51] Int. Cl.$^4$ .............................................. F16F 1/38
[52] U.S. Cl. ................................................. 267/153
[58] Field of Search .................... 267/57.1 A, 57.1 R, 267/153, 154

[56] References Cited

U.S. PATENT DOCUMENTS 3,140,081  7/1964  Peterson ............................... 267/153
3,202,410  8/1965  Schell .................................... 267/153

FOREIGN PATENT DOCUMENTS 2656799  6/1977  Fed. Rep. of Germany ...... 267/153
 821056  8/1937  France ............................ 267/57.1 R
1251719 12/1960  France ................................ 267/153

Primary Examiner—Duane A. Reger
Attorney, Agent, or Firm—G. Kendall Parmelee; George W. Rauchfuss, Jr.

[57]  ABSTRACT

A resilient coupling with a limited range of radial movement is provided, more especially for a pulled wheel attachment, of the type comprising two cylindrical sleeves one of which surrounds the other and between which is adhered a block of a resilient material. In said block of resilient material (3') there is formed laterally at least one groove (5), and preferably two grooves, one at each end of the block.

5 Claims, 4 Drawing Figures

RESILIENT COUPLING WITH A LIMITED RANGE OF RADIAL MOVEMENT, MORE PARTICULARLY FOR A PULLED WHEEL ATTACHMENT

The present invention relates to a resilient coupling with a limited range of radial movement, more particularly for a pulled wheel attachment, of the type comprising two cylindrical sleeves one of which surrounds the other and between which is adhered a block of a resilient material. It could in particular be a coupling for a motor vehicle suspension, said coupling being interposed, as is known, between the body work of the vehicle and at one end of a swinging arm whose other end supports the wheel.

Such couplings are currently used for, because of problems of guiding the undercarriage and road holding problems, there is often need to limit the free movement of the undercarriage in question, in the longitudinal direction of the vehicle, forwardly or rearwardly. That involves a certain stiffness of said block or resilient material, at least from a certain amplitude of deflection.

However, the fairly large free movements of the suspension require on the other hand a thickness of resilient material (elastomer) sufficient to prevent the appearance of torsional shearing forces which are too high and which may therefore affect the resistance to wear and tear of the block of resilient material, or the appearance of excessive return torques which disturb the suspension.

The problem which arises is therefore to satisfy the need for obtaining, in one and the same part, a certain compromise between these different parameters, apparently in contradiction.

The aim of the present invention is to resolve this problem.

This aim is in particular to energetically limit the free movements of the coupling, by means affecting only the structure of the block of resilient material, by causing its normal working section to increase rapidly as soon as the normal deflections of use are exceeded, so as to obtain undercarriage guiding capable of providing good roadholding under all circumstances (for example in bends), and so as to avoid an excessive deflection under an exceptional vertical load (for example when the wheel passes over a pot hole).

For this, a coupling of the above defined type, in accordance with the present invention, is mainly characterized in that said block of resilient material is provided laterally with at least one groove, if required, two grooves may be provided, namely one at each end of said block.

In normal operation, the section of the block of resilient material working under radial deflection, as well as under torsional forces, is that which extends essentially centrally; it will be seen further on which particular shape should advantageously be given to this section.

On the other hand, in the case of an exceptional radial force (pulling in the longitudinal direction or vertically with free movement of the suspension), the groove or grooves close and the working section of the block of resilient material becomes practically equal to the whole of the section extending between the two sleeves, which therefore energetically prevents the deflection from exceeding a certain threshold, fixed beforehand.

This will be seen more clearly in what follows, on reading the description of one embodiment according to the invention, given hereafter by way of example which is in no wise limitative and with reference to the figures of the accompanying drawing in which.

Figure 1:
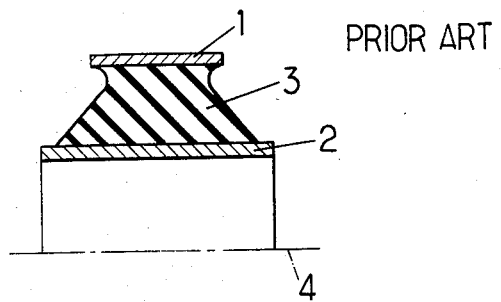
FIG. 1 is an axial half sectional view of a resilient coupling of the prior art.

In FIG. 1, there is shown at 1 the cylindrical outer sleeve of the known coupling, and at 2 the inner resilient sleeve, coaxial to the preceding one. Between the two is adhered a block of resilient material, made for example from elastomer, which is referenced at 3. It can be seen in the Figure that the essential part of the section between the two sleeves is trapezoidal, with the intent of obtaining a uniform distribution of the torsional stresses in the different sections of the elastomer. Thus, the further a peripheral section of the elastomer is removed from the axis 4 of the coupling, the longer it is at the periphery and consequently the more its width must be reduced so that all the cylindrical peripheral sections have the same area and thus undergo the same torsional stresses. This is what imposes the above mentioned trapezoidal shape and which may be expressed by the formula: $S = 0\pi L = cte$, L being the width of any cylindrical peripheral section of the elastomer, 0 being its diameter and S its area.

With such a coupling of the prior art, the elastic deformation of block 3 varies essentially linearly depending on the load, and if no special precaution is taken, a metal-metal shock may occur and an unpleasant noise in the case of a brief very high load, for example when passing over a pot hole or another uneveness in the roadway.

Figure 2:
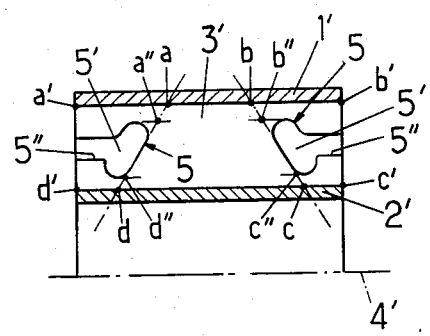
FIG. 2 is a similar view of a resilient coupling in accordance with the present invention.

These disadvantages may be avoided very simply, and without the addition of an extra abutment surface, which would be costly to fit, by an arrangement such as illustrated in FIG. 2 and which, in accordance with the invention, only affects the structure of block 3.

In the ends of this block, referenced at 3' in FIG. 2, and which has here an overall external cylindrical shape, there are provided for this purpose two grooves 5, symmetrical with each other with respect to the median transverse plane of the sleeves, here referenced 1' and 2', their common axis being referenced 4'. They are preferably peripheral grooves but they may possibly only occupy arcs of a circle on this periphery at the ends of the resilient block 3'.

Said grooves 5 preferably each comprise a bottom portion 5' having an elongate shape generally in the radial direction, and which is continued laterally by a recess 5" opening outwardly and having, in the radial direction, a smaller dimension than that of said bottom portion 5'.

The reason for this lengthening of the bottom portions 5' in the radial direction resides in the fact that, under torsion of block 3', the working section does not extend beyond grooves 5; this section is defined by the trapezium a" b" c" d" (so that these points can be clearly seen in FIG. 2, the elastomer forming block 3' has not been shown). With this arrangement, a sufficient radial extension can be given to block 3', as is required, in accordance with what was stated above, for avoiding excessive torsional shearing stresses.

As for the recesses 5", their purpose is to separate as well as possible the two zones of use of the block, their height moreover having to be compatible with the elastomer used, so that the block may be removed from the mold.

In a complementary arrangement of the invention, also shown in FIG. 2, the essentially trapezoidal shape of the section working under torsion a" b" c" d" has been kept, by causing said bottom portions 5' of grooves 5, lengthened generally in the radial direction, to be slanted symmetrically with respect to each other and with respect to the median transverse plane of the sleeves 1', 2', thus defining the two lateral sides of said trapezoidal section a" b" c" d".

As far as radial deformations are concerned, the section concerned is also trapezoidal and is defined by the points a b c d.

Such a coupling, as can be seen, may operate essentially like the one shown in FIG. 1, under normal conditions of use: in particular, it provides a uniform distribution of the torsional stresses throughout the different sections of the elastomer, and it also allows a low torsional return torque to be obtained, the section concerned remaining relatively small, while being compatible with the static load of the vehicle.

On the other hand, the coupling shown in FIG. 2 has the additional advantage of forming an extremely efficient abutment, preventing excessive free movement of the swinging arm of the suspension. In fact, when block 3' is crushed to such an extent that the recesses 5" of grooves 5 are completely closed, the section of the elastomer concerned goes suddenly from the above mentioned trapezoidal section to substantially the whole of the section of the block defined by points a' b' c' d'. The stiffness of the block thus increases suddenly, and prevents the swinging arm from exceeding the range of movement thus fixed.

Should the need arise, closure means may further be provided for closing said grooves without preventing deformation thereof.

Figure 3:
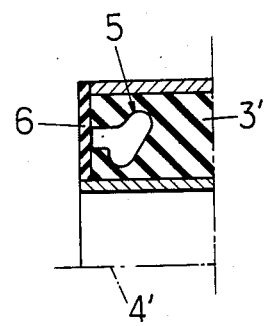
FIGS. 3 and 4 show two different solutions for closing the two peripheral grooves.
Figure 4:
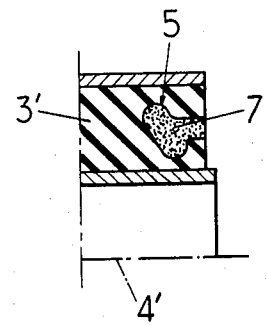

As shown in FIG. 3, these means may be formed by a flexible sealing deflector 6 placed in front of the entrance of said grooves 5 or, as shown in FIG. 4, by a flexible filling plug 7 filling said grooves and being possibly formed for example by a cellular elastomer.

These means efficiently prevent mud, sand or other impurities from penetrating into the grooves 5 of the resilient blocks.

I claim:

1. A resilient coupling with a limited range of radial movement of the type comprising two cylindrical sleeves one of which surrounds the other and between which is adhered a block of a resilient material, wherein in said block of resilient material are formed two grooves extending laterally endwise along the whole periphery of said block and being essentially symmetrical with each other with respect to the median transverse plane of the two cylindrical sleeves, each groove comprising a bottom portion of an elongate shape generally in the radial direction and which is continued laterally by a recess opening outwardly and having, in the radial direction, a smaller dimension than that of said bottom portion.

2. The coupling according to claim 1 wherein the section of said block of resilient material working under torsion is essentially trapezoidal and wherein said bottom portions of said grooves elongate generally in the radial direction and are slanted symmetrically to each other with respect to the median transverse plane of the two cylindrical sleeves thereby defining the two lateral sides of said trapezoidal section.

3. The coupling according to claim 2 comprising a closure means closing said grooves without presenting deformation thereof.

4. The coupling according to claim 3 wherein said closure means are formed by a flexible sealing deflector placed in front of the entrance to said groove.

5. The coupling according to claim 3 wherein said closure means are formed by a flexible filling plugs, filling said grooves.

* * * * *